United States Patent [19]

Quaranta

[11] 4,397,388
[45] Aug. 9, 1983

[54] PORTABLE RECORD STORAGE CONTAINER

[76] Inventor: Anthony A. Quaranta, 8767 Orchard Ave., Pennsauken, N.J. 08109

[21] Appl. No.: 287,436

[22] Filed: Jul. 27, 1981

[51] Int. Cl.³ .............................................. B65D 85/57
[52] U.S. Cl. ..................................... 206/309; 220/22; 217/7; 312/9
[58] Field of Search ............... 206/309, 314, 555, 425; 312/8, 9, 10, 13, 107, 107.5, 183, 193; 220/22.1, 22.3, 20, 21, 24, 93; 217/49, 25.5, 21, 31, 7, 56, 62; 211/40

[56] References Cited

U.S. PATENT DOCUMENTS

| 511582 | 12/1893 | Borden ............................... 220/22.5 |
| 684,899 | 10/1901 | Zimmerli ........................... 220/22.3 |
| 1,124,775 | 1/1915 | Martin ............................... 220/22.3 |
| 1,190,005 | 7/1916 | Ralph ................................ 206/309 |
| 1,264,002 | 4/1918 | Blalock ............................. 217/62 |
| 1,887,882 | 11/1932 | Bredsvold ......................... 312/183 |
| 2,258,666 | 10/1941 | Walker . |
| 2,587,269 | 2/1952 | Yerkes .............................. 312/10 |
| 2,657,692 | 11/1953 | Dahl . |
| 2,938,623 | 5/1960 | Eichorn . |
| 3,114,459 | 12/1963 | Kersting ........................... 211/40 |
| 3,224,824 | 12/1965 | Remke .............................. 312/183 |
| 3,334,635 | 8/1967 | Fleischhauer et al. . |
| 3,575,284 | 4/1971 | Holt . |
| 3,900,157 | 8/1975 | Roth . |
| 3,902,595 | 9/1975 | Mori . |
| 4,005,797 | 2/1977 | Ingram ............................. 312/183 X |
| 4,012,087 | 3/1977 | Edwards, Jr. . |

FOREIGN PATENT DOCUMENTS

| 1202641 | 7/1959 | France ............................. 206/309 |
| 206217 | 12/1920 | United Kingdom .............. 217/7 |

*Primary Examiner*—Steven M. Pollard
*Assistant Examiner*—Bryon Gehman
*Attorney, Agent, or Firm*—Jacob Trachtman

[57] ABSTRACT

A portable storage container for records comprising a body having a cavity for receiving a stack of vertically arranged records which has first and second plane ends. The cavity has a vertical back wall for engaging the second end of the stack of records and a front wall which is inclined for allowing selective displacement and separation of the tops of the records towards the front wall. A removable locking means is positionable for engaging the first end of the stack of records for retaining the records in a vertical position and preventing their displacement and separation during storage and transportation of the records.

10 Claims, 6 Drawing Figures

U.S. Patent   Aug. 9, 1983   4,397,388
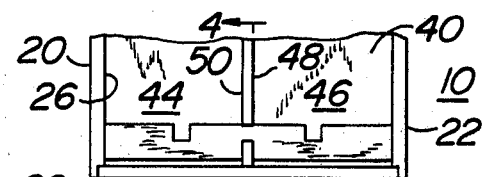
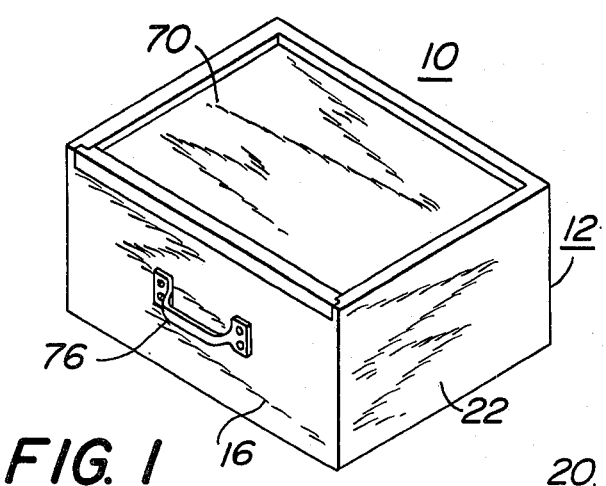
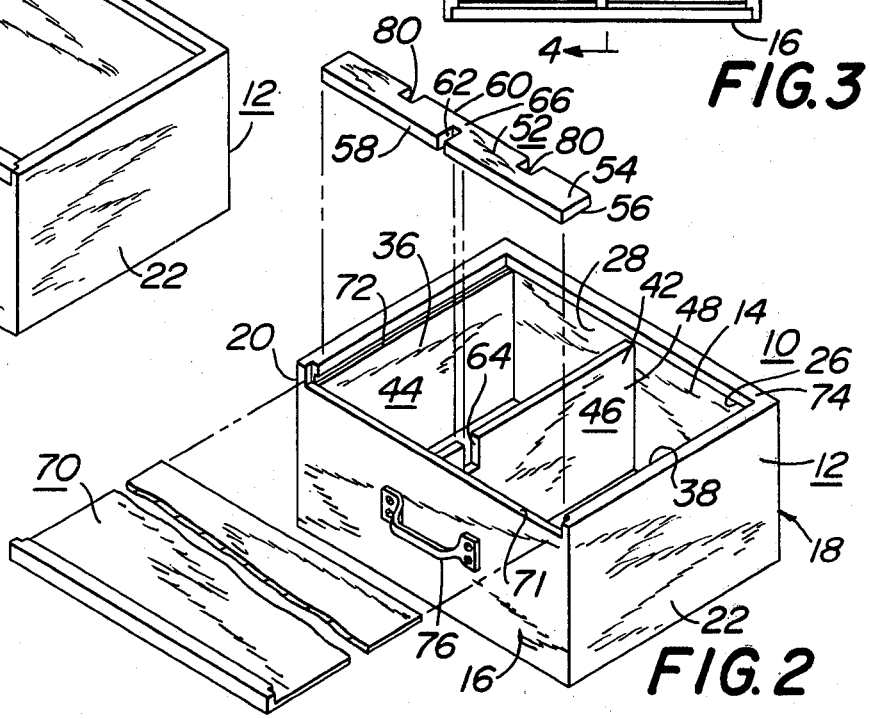
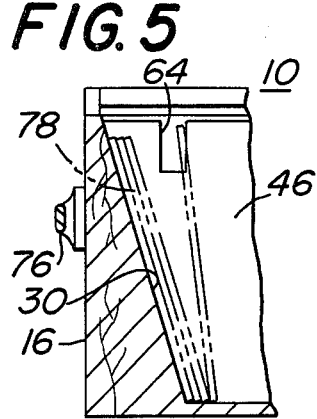
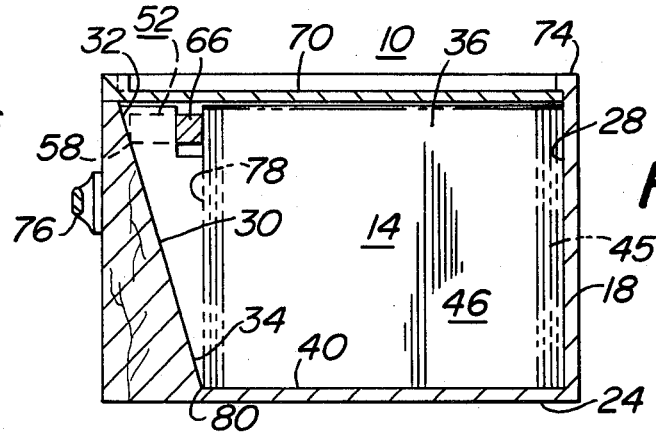
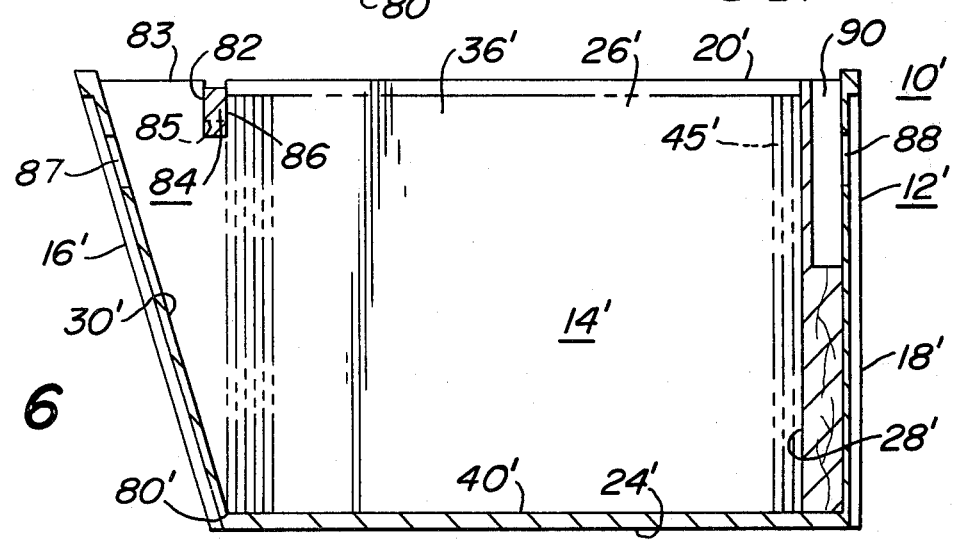

PORTABLE RECORD STORAGE CONTAINER

The invention relates to a storage container, and more particularly to a portable storage container for phonograph records allowing ready access to stored phonograph records and easy selection and removal of any one or more of the records contained therein.

BACKGROUND OF THE INVENTION

Since phonograph records are fragile and may readily be damaged in transportation or storage, it is most important that means be provided to insure their safety, especially in view of the fact that many such phonograph records are collectors' items and may not readily be replaced. To prevent deformation, the records are preferably stored in a vertical position, and to prevent breakage when they are transported, should be retained to prevent relative movement or flexing. However, when the records are to be used, such stacked records must be individually separable, so that the face of each can be read and identified and readily removed and replaced. The records thus, must be placed in condition for being moved or transported by being retained in a non-movable state, or released from such condition to allow, selection, removal and replacement of individual or all of the records at will. When being transported, the container should protect the records to the maximum extent to insure minimum damage, especially if the container is dropped.

SUMMARY OF THE INVENTION

It is therefore a principle object of the invention to provide a new and improved portable container for phonograph records which will allow transportation with maximum safety, and also allow easy inspection, removal and replacement of records when the records are being used.

Another object of the invention is to provide a new and improved portable storage container for records which may readily be conditioned for either transporting a stack of phonograph records or allowing use of the records while within the container with maximum of ease.

Another object of the invention is to provide a new and improved portable storage container for records providing protection for the records contained therein while being moved or used, and maximizing protection during transportation of the records.

Another object of the invention is to provide a new and improved portable storage container for records having a locking bar which may readily be removed to allow ready use of the records while in the container, and which can be replaced to provide maximum safety during storage and transportation.

Another object of the invention is to provide a new and improved portable storage container for records which is readily adaptable for containing phonograph records of different size.

Another object of the invention is to provide a new and improved storage container for records which is highly durable and is easily and inexpensively manufactured.

The above objects of the invention as well as many others are achieved by providing a portable storage container for phonograph records comprising a body having a cavity for receiving a stack of vertically arranged records having first and second plane ends. The cavity of the container has a vertical back wall for engaging the second end of the stack of records and a front wall which is inclined for allowing selective displacement and separation of the tops of the records towards the front wall. A locking means is receiveable within the cavity of the container and is positionable for engaging the first end of the stack of records and retaining the records in a vertical position and preventing their displacement and separation. The cavity of the container has a bottom horizontal wall between the front and back walls for engaging the bottom of the stack of records, and the body has an opening to the cavity at its top opposite the bottom wall and extending between the front and back walls. The cavity of the container has a pair of parallel vertical side walls each extending on opposite sides between the front and back walls.

The locking means is a removable bar receivable within the cavity of the body through its opening over the inclined front wall, and engages the stack of records at the top of its first end so that the first end of the stack is in a vertical plane when the bottom of the first end is positioned along the line of intersection of the front and bottom walls.

In one of its forms the portable storage container has an intermediate vertical wall partitioning the cavity of the body into two compartments for receiving respective stacks of records with the intermediate wall extending parallel to the pair of side walls between the front and back walls of the container. The container may also be provided with a cover for enclosing the opening at the top of the container, and with handle means for carrying the container with the front wall positioned upwardly and the back wall positioned downwardly.

BRIEF DESCRIPTION OF THE DRAWING

The above objects as well as many other objects of the invention will become apparent from the following detailed description thereof provided in connection with the drawing, in which:

FIG. 1 is a perspective view of a portable storage container for records embodying the invention, FIG. 2 is an exploded perspective view of the container of FIG. 1, FIG. 3 is a top plan view of the container of FIG. 1 with the cover removed and a portion broken away, FIG. 4 is a sectional view taken on the line 4—4 of FIG. 3 of the container having a stack of records therein and with its locking bar and cover in place, FIG. 5 is the left portion of FIG. 4 showing the locking bar and cover removed, and FIG. 6 is a sectional view similar to FIG. 4 of a modified form of the container.

Like numerals designate like parts throughout the several views.

DETAILED DESCRIPTION

Refer to the FIGS. 1 through 5 which illustrate a portable storage container 10 for phonograph records embodying the invention. The storage container 10 has a body 12 which may be made of any suitable material such as wood, plastic or metal, providing a cavity 14 therein, and having front and back sides 16 and 18, and left and right sides 20 and 22. The body 12 has a bottom 24 and an opening 26 at its top communicating with the cavity 14. The cavity 14 has a vertical back wall 28 and a front wall 30 (see FIG. 4) which is inclined with the vertical plane, so that its top 32 is displaced from the back wall to a greater degree than its bottom 34. The cavity 14 is also bounded by vertical spaced walls 36 and 38 which are parallel to each other and extend between the front and back walls 30, 28, and a bottom wall 40 which is opposite to the opening 26 to the cavity 14 and intersects the walls 28, 30, 36 and 38 at their bottoms along respective straight lines.

The container 10 is provided with an intermediate member 42 partitioning the cavity 14 into two equal compartments 44 and 46 provided by its vertical walls 48, 50. The compartment 44 and 46 are each adapted for receiving a respective stack 45 of vertically arranged phonograph records as shown in FIG. 4.

A locking bar 52 with a rectangular cross section, has top and bottom horizontal surfaces 54 and 56 (FIG. 2) and front and rear vertical surfaces 58 and 60, and is adapted for being received through the opening 26 into the cavity 14 of the body 12. The locking bar 52 has a cut out portion 62, at its center extending from its front surface 58 towards its rear surface 60, and the intermediate member 48 has a cut out portion 64 at its top spaced near to the front wall 30. Thus, when the locking bar 52 is received into the cavity 14, its intermediate connecting portion 66 is received into the cut out portion 64 of the member 48, and the cut out portion 62 of the bar 52 receives therethrough the portion of the member 48 which is between the cut out portion 64 and the front wall 30. This interengagement retains and positions the locking bar within the cavity 14 with its front surface 58 extending along and engaging the wall 30 at its top 32. When the locking bar 52 is in position as shown in FIG. 4, the stacks of records received within the sections 44 and 46 are each respectively engaged by a portion of the rear vertical surface 60 of the locking bar 52 at its respective left and right end portions.

The container 10 is provided with a cover 70 which is received over the top edge 71 of the front side 16 into a pair of grooves 72 provided respectively along the top of each of the side walls 36 and 38, and under the ledge 74 of the back side 18 to enclose the opening 26 of the body 12 and seal the cavity 14 with the locking bar 52 and records therewithin. The container 10 is provided with a handle 76 secured with the front side 16 to allow the container to be carried with its front side 16 positioned upwardly and its back side 18 directed downwardly.

In operation, the cover 70 and locking bar 52 are removed for the purpose of loading the container with records. Phonograph records preferably in their sleeves or covers are placed into the compartments 44 and 46 so that they are in a plane parallel to the vertical plane of the back wall 28. The compartments have a width so that when the records are received therein, a minimal amount of side to side motion is permitted. The compartments are filled with records until the front record 78 of the stack of records 45 has its bottom edge along the line of intersection 80 between the bottom wall 40 and the front wall 30 with no spacing between records. Under such circumstances, when the locking bar 52 is placed in position as shown in FIG. 4, the stack of records 45 are maintained in compact vertically aligned form which minimizes movement of the records. The records thus may be transported with greater safety. Since the handle 76 permits the carrying of the container 10 with its back side 18 downward, the dropping of the container 10 while being carried will cause it to strike its back side 18. This will minimize damage to the records contained therein, since they will have force equally applied to the plane surface of the records 45 transmitted from the entire surface of the wall 28.

When the records in the container 10 are to be used, the cover 70 is readily slideably removed, and the locking bar 52 is moved upwardly out of the cavity 14. When this is accomplished, the stack of records may have their top portions moved towards the front wall 30 as shown in FIG. 5, permitting individual records to be viewed and selected. The records of the stack 45 may also readily be removed and replaced at any desired location after use by appropriate displacement to the tops of the records. Since the records are tightly stacked to minimize their movement when the locking bar 52 is in position, the locking bar 52 is under pressure. For this reason finger cut outs 80 are provided to allow the bar 52 to be gripped on each side to permit it to be more easily removed.

Although the portable storage container 10 with its dual compartments 44 and 46 is particularly designed for receiving 45 rpm records, which are of reduced size relative to 33⅓ rpm records, the container 10 can be dimensioned for receiving records of various sizes and may be provided with one or more partition members 48, or without a partition member depending upon the design requirements.

Refer to FIG. 6 which is a sectional view of a container 10' similar to the container 10, and although adapted for receiving larger phonograph records such as the 33⅓ rpm records, may be designed for containing records of any desired size. Since many features of the container 10' is similar to those of the container 10, the description is directed mainly to the difference of this embodiment. The container 10' comprises a body 12' providing a cavity 14' therein, and having front and back sides 16', 18', left and right sides 20' and a bottom 24'. The cavity 14' is bounded by walls spaced to receive a stack of vertically arranged records through an opening 26' in the body 12', the cavity having a vertical back wall 28', inclined front wall 30', left and right parallel vertical side walls 36' and bottom wall 40'. Each of the parallel sides 20' is provided with a cut out portion 82 extending downwardly from its top edge 83 and spaced from the top of the front wall 30'.

A locking bar 84 extends between the sides 20' and has each of its ends respectively received within one of the cut out portions 82 for positioning and retaining same. The ends of the locking bar 84 are also each provided with a slit 85 in its bottom surface for engaging its respective one of the sides 20' at the bottom of its cut out 82 to insure against lateral movement of the bar 84 along the cut out portions 82. When thus positioned, the locking bar which is rectangular in cross-section has a rear vertical surface 86 which contacts the front end of the stack of records 45' along its top portion. The vertical plane of the surface 86 of the bar 84 contains therein the line of intersection 80' formed between the bottom wall 40' and the front wall 30'.

The container 10' illustrated is not provided with a cover, although one may be added if desirable. A pair of hand hold openings 87, 88 are provided respectively in the front and back sides 16', 18' of the container 10', and a space 90 is provided in the back side to allow the fingers of the hand to extend thereinto through the opening 88. A similar space is provided within the cavity 14' proximate to the opening 87 when the locking bar 84 is positioned as shown in FIG. 6, and the records 45' are retained in vertical array for being transported.

The portable storage container 10' is used in a manner similar to that of the container 10, in which the locking bar 84 is removable to allow displacement of the records from their vertical aligned position for selection and removal of records when in use. The records 45' are stacked in a vertical position and the locking bar 84 is replaced by moving it vertically into the cut outs 82 while the stack of records is compressed toward the back wall 28'. The records then may be stored or transported while they are maintained in a compressed stacked condition which will assure their safety and minimize damage to them.

It will, of course, be understood that the description and drawings, herein contained, are illustrative merely, and that various modifications may be made in the structure disclosed without departing from the spirit of the invention.

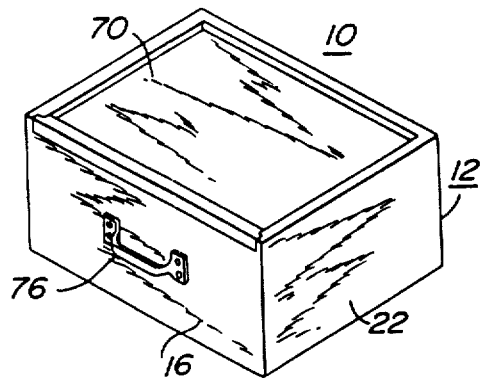

What is claimed is:

1. A portable storage container for records comprising a body having a cavity for receiving a stack of vertically arranged records having vertically positionable first and second plane ends, a vertical back wall for engaging the second end of the stack of records, and a front wall which is inclined for allowing selective displacement and separation of the records toward the front wall; and locking means having a vertical contact surface positionable within the cavity of the body between the inclined front wall and the first plane end of the stack of records to have its contact surface engage the first end of the stack of records for compressing the stack of records between it and the back wall and retaining the records in a vertical position and preventing their displacement and separation and being removable for allowing the displacement of the first plane end of the stack of records toward and into engagement with the inclined front wall of the body.

2. The storage container of claim 1 in which the cavity of the body has a pair of parallel vertical side walls each extending on opposite sides between the front and back walls and a bottom horizontal wall between the front and back walls for engaging the bottom of the stack of records, the body has an opening to the cavity at its top opposite the bottom wall and extending between the front and back walls, and the locking means and its contact surface extend between the vertical side walls of the body for engaging therealong the vertically positioned first plane end of the stack of records.

3. The storage container of claim 2 in which the locking means is a removable bar receivable within the cavity of the body at its opening over the inclined front wall.

4. The storage container of claim 3 in which the bottom wall intersects the front wall in a line, and the locking means engages the stack of records at the top of its first end so that the first end of the stack is in a vertical plane when the bottom of the first end is positioned along the line of intersection of the front and bottom walls.

5. The storage container of claim 4 in which the locking means has ends for respectively detachably engaging the vertical side walls of the body.

6. The storage container of claim 5 in which the locking means is a bar which extends between the side walls and its contact surface for engaging the first end of the stack of records lies in a vertical plane containing the line of intersection of the front and bottom walls.

7. The storage container of claim 6 in which the side walls each have a cut out portion near to the front wall, and the locking bar has opposite ends which respectively detachably engage the cut out portions of the side walls for retaining and positioning the locking bar for engagement with the stack of records.

8. The storage container of claim 6 including an intermediate vertical wall partitioning the cavity of the body into two compartments for receiving respective stacks of records, the intermediate wall extending parallel to the pair of side walls between the front and back walls of the container.

9. The storage container of claim 8 in which the intermediate wall has a cut out portion near to the top portion of the front wall, and the locking bar extends along and contacts the top portion of the front wall and detachably engages the cut out portion of the intermediate wall for retaining and positioning the locking bar for engagement with the stacks of records, the locking bar having at least one finger cut out for allowing removal of the locking bar when it is in engagement with the stacks of records.

10. The storage container of claim 9 in which the body has a cover for enclosing the opening at the top of the body, and includes handle means secured with the body for carrying the container with the front wall positioned upwardly and the back wall directed downwardly.

* * * * *

UNITED STATES PATENT AND TRADEMARK OFFICE
CERTIFICATE OF CORRECTION

PATENT NO. : 4,397,388

DATED : August 9, 1983

INVENTOR(S) : Anthony A. Quaranta

It is certified that error appears in the above-identified patent and that said Letters Patent is hereby corrected as shown below:

The title page should be deleted to appear as per attached title page.

Signed and Sealed this

Twenty-seventh Day of November 1984

[SEAL]

Attest:

GERALD J. MOSSINGHOFF

Attesting Officer     Commissioner of Patents and Trademarks

United States Patent [19]

Quaranta

[11] 4,397,388
[45] Aug. 9, 1983

[54] PORTABLE RECORD STORAGE CONTAINER

[76] Inventor: Anthony A. Quaranta, 8767 Orchard Ave., Pennsauken, N.J. 08109

[21] Appl. No.: 287,436

[22] Filed: Jul. 27, 1981

[51] Int. Cl.³ .............................................. B65D 85/57
[52] U.S. Cl. ...................................... 206/309; 220/22; 217/7; 312/9
[58] Field of Search ............... 206/309, 314, 555, 425; 312/8, 9, 10, 13, 107, 107.5, 183, 193; 220/22.1, 22.3, 20, 21, 24, 93; 217/49, 25.5, 21, 31, 7, 56, 62; 211/40

[56] References Cited

U.S. PATENT DOCUMENTS

| | | | |
|---|---|---|---|
| 511582 | 12/1893 | Borden | 220/22.5 |
| 684,899 | 10/1901 | Zimmerli | 220/22.3 |
| 1,124,775 | 1/1915 | Martin | 220/22.3 |
| 1,190,005 | 7/1916 | Ralph | 206/309 |
| 1,264,002 | 4/1918 | Blalock | 217/62 |
| 1,887,882 | 11/1932 | Bredsvold | 312/183 |
| 2,258,666 | 10/1941 | Walker | |
| 2,587,269 | 2/1952 | Yerkes | 312/10 |
| 2,657,692 | 11/1953 | Dahl | |
| 2,938,623 | 5/1960 | Eichorn | |
| 3,114,459 | 12/1963 | Kersting | 211/40 |
| 3,224,824 | 12/1965 | Remke | 312/183 |
| 3,334,635 | 8/1967 | Fleischhauer et al. | |
| 3,575,284 | 4/1971 | Holt | |
| 3,900,157 | 8/1975 | Roth | |
| 3,902,595 | 9/1975 | Mori | |
| 4,005,797 | 2/1977 | Ingram | 312/183 X |
| 4,012,087 | 3/1977 | Edwards, Jr. | |

FOREIGN PATENT DOCUMENTS

| | | | |
|---|---|---|---|
| 1202641 | 7/1959 | France | 206/309 |
| 206217 | 12/1920 | United Kingdom | 217/7 |

Primary Examiner—Steven M. Pollard
Assistant Examiner—Bryon Gehman
Attorney, Agent, or Firm—Jacob Trachtman

[57] ABSTRACT

A portable storage container for records comprising a body having a cavity for receiving a stack of vertically arranged records which has first and second plane ends. The cavity has a vertical back wall for engaging the second end of the stack of records and a front wall which is inclined for allowing selective displacement and separation of the tops of the records towards the front wall. A removable locking means is positionable for engaging the first end of the stack of records for retaining the records in a vertical position and preventing their displacement and separation during storage and transportation of the records.

10 Claims, 6 Drawing Figures